(12) United States Patent
Schallmeier

(10) Patent No.: US 9,421,839 B2
(45) Date of Patent: Aug. 23, 2016

(54) HIGH ACCURACY LOAD DETECTION FOR AIR SUSPENSION SYSTEMS

(71) Applicant: Continental Automotive Systems, Inc., Auburn Hills, MI (US)

(72) Inventor: Christian Schallmeier, Lake Orion, MI (US)

(73) Assignee: Continental Automotive Systems, Inc., Auburn Hills, MI (US)

(\*) Notice: Subject to any disclaimer, the term of this patent is extended or adjusted under 35 U.S.C. 154(b) by 0 days.

(21) Appl. No.: 14/560,034

(22) Filed: Dec. 4, 2014

(65) Prior Publication Data

US 2015/0151599 A1   Jun. 4, 2015

Related U.S. Application Data

(60) Provisional application No. 61/911,734, filed on Dec. 4, 2013.

(51) Int. Cl.
*B60G 11/27* (2006.01)
*F16F 9/02* (2006.01)
*B60G 17/019* (2006.01)

(52) U.S. Cl.
CPC .............. *B60G 11/27* (2013.01); *B60G 17/019* (2013.01); *F16F 9/0281* (2013.01); *B60G 2202/152* (2013.01); *B60G 2400/51222* (2013.01)

(58) Field of Classification Search
CPC ................. B60G 11/27; B60G 17/019; B60G 2202/152; B60G 2400/51222; F16F 9/0281
USPC .............................................. 701/37
See application file for complete search history.

(56) References Cited

U.S. PATENT DOCUMENTS

| | | | | |
|---|---|---|---|---|
| 2002/0038193 A1* | 3/2002 | Grunberg | ............... | B60G 11/27 702/173 |
| 2012/0056389 A1* | 3/2012 | Leclerc | .................. | B60G 11/58 280/5.507 |
| 2013/0275002 A1* | 10/2013 | MacFarlane | ........... | B60G 17/04 701/37 |
| 2014/0350787 A1* | 11/2014 | Swanson | ............ | B60G 17/0195 701/38 |

\* cited by examiner

*Primary Examiner* — Brian P Sweeney

(57) ABSTRACT

A suspension system comprises an air supply unit and four air spring corner assemblies. The air supply unit including an ECU is fluidly connected to the air spring corner assemblies and is capable of independently adjusting the air spring corner assemblies from one another. A first pressure sensor is located at a valve block of the air supply unit. The pressure signal from the first pressure sensor is used to determine a vehicle load. A second pressure sensor proximate to at least one air spring to detect air pressure of the system at that air spring and to calibrate an air pressure for at least one of the other air springs.

5 Claims, 2 Drawing Sheets

HIGH ACCURACY LOAD DETECTION FOR AIR SUSPENSION SYSTEMS

CROSS-REFERENCE TO RELATED APPLICATIONS

This disclosure claims priority to U.S. Provisional Application No. 61/911,734, which was filed on Dec. 4, 2013 and is incorporated herein by reference.

TECHNICAL FIELD

The present disclosure relates to automotive vehicles and more particularly to suspension systems for automotive vehicles.

BACKGROUND

Suspension systems for automotive vehicles provide vehicle passengers with a more comfortable ride. Demand from vehicle owners for improved comfort, fuel economy, and more controls and options has led to the development of adjustable air suspension systems. Depending on the current driving surface, different suspension operating modes may be selected by the vehicle operator. The suspension operating modes have present suspension parameters to provide the ideal suspension arrangement for various driving situations. Typical operating modes a driver may select include, a standard driving mode, such as a comfort or sport mode, a snow mode, an off-roading mode, etc. In addition to providing selected operating modes for various driving situations the suspension system may be adjusted when select operating conditions are met.

The accuracy of load detection is mainly limited by the fact, that the pressure sensor, used to measure the air spring pressures, is physically far away from the air springs. As a consequence, the air lines between spring and sensor, can imply an error to the measurement. This results in limited accuracy of the load detection algorithm. The system suffers from low accuracy due to imperfections and tolerances of the components. In addition to that, the sensor position, being in the solenoid valve block, adds inaccuracy due to physical distance and length of the air line connection.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A suspension system comprises an air supply unit and four air spring corner assemblies. One air spring corner assembly is located at a suspension position corresponding to each of the wheel corners for the vehicle and the air supply unit including an ECU is fluidly connected to the air spring corner assemblies. The air supply unit is capable of independently adjusting the air spring corner assemblies from one another. A first pressure sensor is located at a valve block of the air supply unit. The pressure signal from the first pressure sensor is used to determine a vehicle load. A second pressure sensor proximate to at least one air spring to detect air pressure of the system at that air spring and to calibrate an air pressure for at least one of the other air springs.

A method of determining vehicle load for a vehicle equipped with an air suspension system comprises detecting a first pressure signal from a first sensor located for the air suspension system. A vehicle load is calculated based on the first pressure signal. A second pressure signal from a second sensor for an air spring at one corner of the air suspension system is also detected. A corrected vehicle load or a corrected axle load is calculated based on the first pressure signal and the second pressure signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
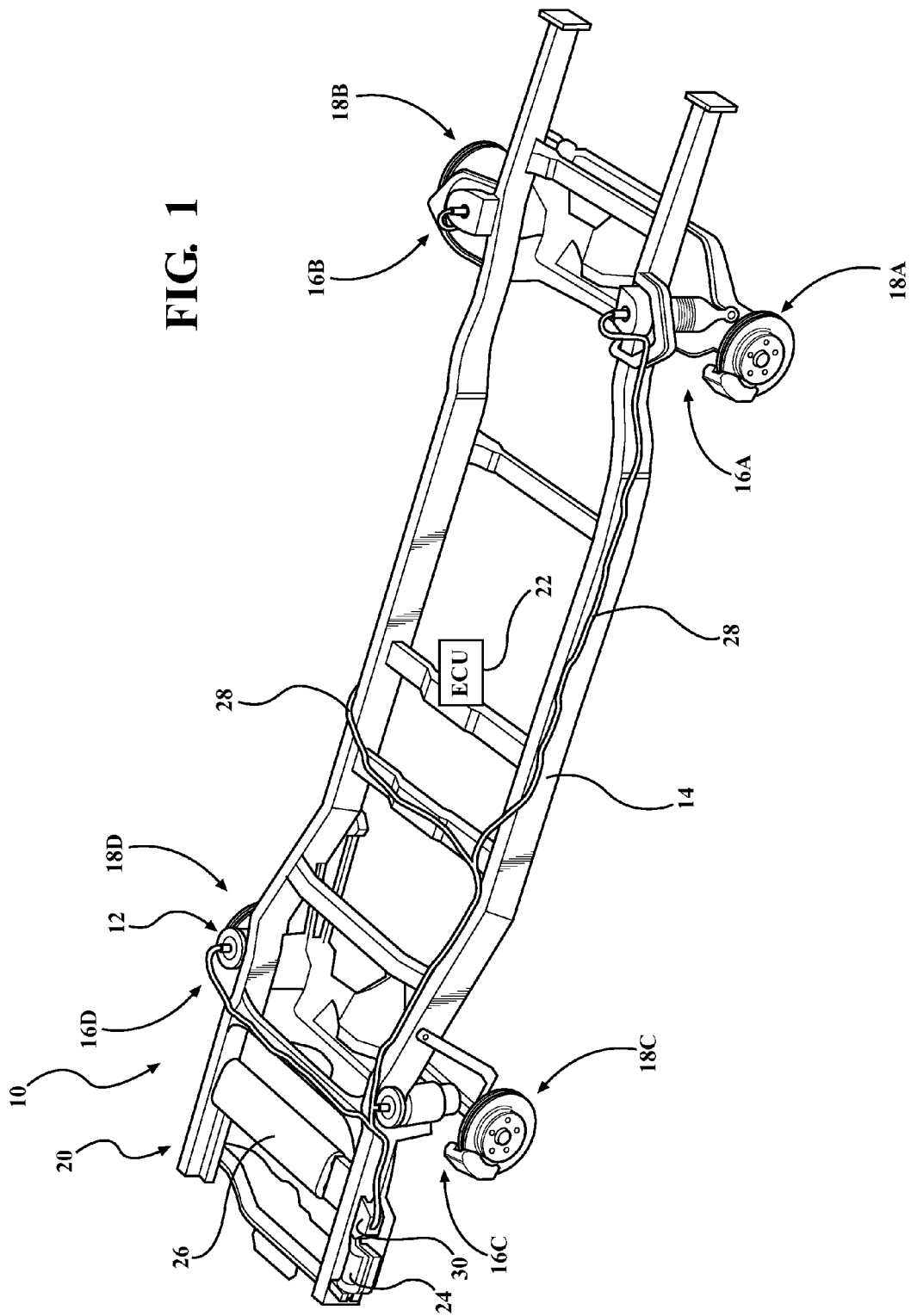
FIG. 1 is a schematic illustration of an air suspension system for use with the present invention.

The following description is merely exemplary in nature and is in no way intended to limit the disclosure, its application, or uses. For purposes of clarity, the same reference numbers will be used in the drawings to identify similar elements. FIG. 1 illustrates a vehicle, in this instance a pickup truck, 10 having an air suspension system 12. The air suspension system 12 is supported by a frame 14. The air suspensions system has four corner assemblies 16A-D located at each of the wheel 18 locations of the vehicle 10. The four corner assemblies 16A-D may be independently adjustable. Two corner assemblies 16A, B are located at the front wheel 18A, B corners of the vehicle 10 and two corner assemblies 16C, D are located at the rear wheel 18C, D corners of the vehicle.

The air suspension system 12 includes an air supply unit 20 fluidly connected to the four corner assemblies 16A-D. The air supply unit 20 includes an electronic control unit (ECU) 22, a compressor 24, a reservoir 26 and a valve block 30. The individual components of the air supply unit 20 may be assembled together or supported on the vehicle 10 at separate locations. In the embodiment shown, the ECU 22 is located remote from the compressor 24, reservoir 26 and valve block 30 (electrical connections not shown). Alternatively, the air suspensions system 12 may be an open loop system and the air supply unit 20 may not include a reservoir 26.

The air supply unit 20 is connected to the four corner assemblies 16A-D through the supply lines 28. In the example shown, the air suspension system 12 is a closed system. The valve block 30 is controlled by the ECU 22 to regulate the air supply between the compressor 24, the reservoir 26 and the four corner assemblies 16A-D. The valve block 30 may be a single unit defining multiple valves, multiple valves located together, or multiple valves at different locations. Additionally, the reservoir 26 may be a single or multiple tank assembly.

While the embodiment disclosed has four corner assemblies 16A-D, the suspension system 12 may also be a system where the front and rear axle are separately adjustable, and does not necessarily require separate adjustment at each of the corner assemblies 16A-D. The four corner assemblies 16A-D are adjustable to accommodate various driving conditions. Based upon the selected suspension mode the ECU 22 will regulate the air supply between the compressor 24, reservoir 26 and the four corner assemblies 16A-D to adjust the four corner assemblies 16A-D from the current positions to the desired positions. When lowering any of the corner assemblies 16A-D the excess air is sent to the reservoir 26 for storage. When raising any of the corner assemblies 16A-D the required air is sent from the reservoir 26 to the appropriate corner assembly 16A-D. The compressor 24 ensures that the air pressure within the system 12 is maintained at the desired level. Alternately, in the instance of an open system the excess air is released to the environment or pulled from the environment and pressurized as needed. The compressor 24 ensures that the air pressure within the system 12 is maintained at the desired level.

The air suspension system 12 may be adjusted at the direction of the vehicle operator by moving a selector, or when pre-determined operating conditions exist, e.g. the vehicle 10 accelerates above a certain speed then the suspension system 12 is lowered, when the vehicle 10 decelerates below a pre-determined threshold the suspension system 12 raised. Therefore, the air suspension system 12 may be adjusted while the vehicle 10 is in motion. In this instance, the front corner assemblies 16A, B may be adjustable together and the rear corner assemblies 16C, D may be adjustable together. To provide the most aerodynamic adjustment possible, when the vehicle is travelling in a forward direction, the rear corner assemblies are adjusted to the new position first when the suspension system 12 is raised. However, when the suspension system 12 is lowered, the front corner assemblies 16A, B are adjusted to the new position first. Alternately, each corner 16A-D could be adjusted separately or all corners 116A-D could be adjusted simultaneously.

Figure 2:
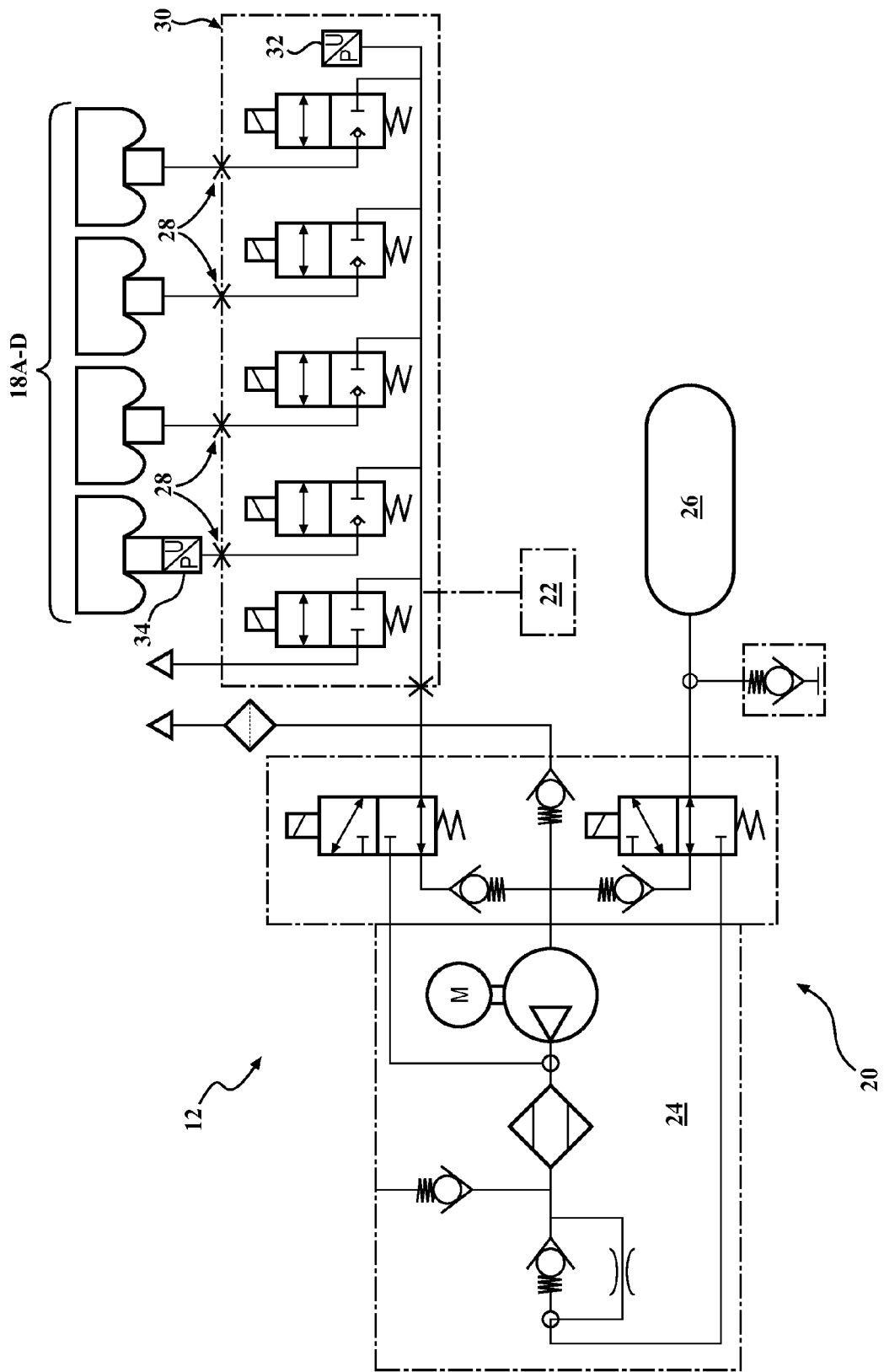
FIG. 2 is a schematic illustration of one embodiment of the present invention.

Referring to FIGS. 1 and 2, the solenoid valve block 30 has four air spring valves 36, an exhaust valve 38 and a pressure sensor 32. The fluid lines 28 connect the reservoir 26 to the compressor 24, e.g. the fluid line 28 is a 6×1 mm tube, the compressor 24 to the valve block 30, e.g. the fluid line 28 is a 6×1.5 mm tube, and the valve block 30 to the air springs 16A-D e.g. the fluid lines 28 are a 6×1.5 mm tube. The first pressure sensor 32 may be proximate to or directly connected to the valve block 30

The solenoid valve block 30 is used to manage the air flow between the system components 16A-D, 24, 26. The signal from the pressure sensor 32 can be used to determine a vehicle load. The vehicle load information is then used by the ECU 22 to help determine the desired adjustments for the air suspension system 12, e.g. increasing height to accommodate for heavy vehicle load.

However, the physical distance between spring modules 16A-D and valve block 30 can be very long. The length of the applicable fluid line 28 may result in a variation between the actual pressure at the air spring 16A-D for that fluid line 28 and the pressure reading at the pressure sensor 32 in the valve block 30. Therefore, an additional pressure sensor proximate to one air spring 16A-D, will drastically improve the accuracy on that one corner 16A-D. For example, the air spring corner 16A-D with the second pressure sensor 34 is one of the front corners 16A-B, which may have the longer fluid lines 28 between the air springs 16A-B and the valve block 30. The second pressure sensor 34 can be directly secured to the air spring 16A-D, located between the air spring 16A-D and the fluid line(s) 28, or connected to the fluid line(s) 28 proximate one of the air springs 16A-D.

The pressure reading from the second pressure sensor 34 is provided to the ECU 22 for comparison and adjustment with the first pressure sensor 32. The second pressure reading provides a high accuracy pressure reading which is then used to calibrate the system and calculate a high accuracy load value for both front axle corners 16A, B or the whole front axle. A similar approach could be used for the rear axle springs 16C, D, as well. The use of the additional sensor(s) is used in combination with the evaluation algorithms provide increased accuracy of the load information.

Alternatively, the air supply unit 20 may be located at the front of the vehicle 10 and the longer fluid supply lines 28 may be associated with the rear axle for the vehicle 10. In such a case, the second pressure sensor 34 may be associated within one of the rear corners 16C, D of the vehicle 10. In addition, the location of the second pressure sensor 34 may be selected to provide higher accuracy at that particular axle regardless of the distance from the air supply unit 20, i.e. for pickup trucks accuracy at the rear axle may be more important than accuracy at the front axle. In one embodiment, a third sensor (not shown) may also associate with one corner and the second sensor 34 and the third sensor are each associated with corners of different axles.

The use of an additional sensor 34 proximate to the spring 16A-D would provide a significant increase of accuracy. As sensors 32, 34 are expensive, it would be possible to use only one additional sensor 34, and use an algorithm, that uses the additional input from the second sensors 34 along with the pressure reading from the first sensor 32 to calculate the high accuracy value. The pressure signal from the second pressure sensor 34 associated with one corner 16A-D, can be used to determine the load at the other corner of that axle, which is not measured directly. For example, if the pressure senor is associated with corner 16C of the rear axle, the load at corner 16D can more accurately be calculated as well.

The increased accuracy of the load detection can be used to more finely adjust the suspensions system 12 based on the provided readings. In addition, the increased accuracy can be used to more closely monitor load (especially on the rear axle for a pick up) to prevent overload situations and provide a more robust measurement for failsafe operation in overload conditions. In fact, the overall high payload specification may even be increased due to the increased measurement accuracy that is available to the system, e.g. because the load measurement is more accurate the design margin to protect against overloading situations can be smaller.

Therefore, a vehicle load management system comprises an air suspension unit 12 having four air spring corner assemblies 16A-D. One air spring corner assembly 16A-D is located at a suspension position corresponding to each of the wheel corners 18A-D for the vehicle 10 and an air supply unit 20 including an ECU 22 is fluidly connected 28 to the air spring corner assemblies 16A-D. The air supply unit 20 is capable of independently adjusting the air spring corner assemblies 16A-D from one another. A first pressure sensor 32 is located at a valve block 30 of the air supply unit 20. The pressure signal from the first pressure sensor 32 is used to determine a vehicle load. A second pressure sensor 34 proximate to at least one air spring 16A-D to detect air pressure of the system 12 at that air spring 16A-D and to calibrate an air pressure for at least one of the other air springs 16A-D. For example, the second pressure sensor 34 is proximate to an air spring 16C-D for a rear axle of the vehicle 10, and the at least one of the other air springs 16C-D is at the other corner of the rear axle. The vehicle load, the second pressure, and the calibrated pressure are used to determine the rear axle load or the second pressure and calibrated pressure are used to adjust the vehicle load determined from the first pressure signal. The design margin for an overload situation is decreased when using the second sensor, from a one sensor system 12.

One method of determining vehicle load for a vehicle 10 equipped with an air suspension system 12 comprises detecting a first pressure signal from a first sensor 32 located within a valve block 30 for the air suspension system 12. A vehicle load is calculated based on the first pressure signal. A second pressure signal from a second sensor 34 for an air spring 16A-D at one corner of the air suspension system 12 is also detected. A corrected vehicle load or a corrected axle load is calculated based on the first pressure signal and the second pressure signal. The second pressure signal may be for an air spring 16C-D at one corner a rear axle of the vehicle 10, and wherein a calibrated pressure is determined from the second pressure signal for the air spring 16C-D at the other corner of the rear axle. he design margin for an overload situation is decreased when using the second sensor, from a one sensor system 12.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. An air suspension system comprising:
    four air spring corner assemblies, wherein one air spring corner assembly is located at a suspension position corresponding to each of the wheel corners for the vehicle;
    an air supply unit including an ECU fluidly connected to the air spring corner assemblies, wherein the air supply unit is configured to adjust the air spring corner assemblies independently from one another based at least partially based on a vehicle load;
    a first pressure sensor located at a valve block of the air supply unit and in communication with the ECU, where the pressure signal from the first pressure sensor is used by the ECU to determine the vehicle load; and
    a second pressure sensor proximate to at least one air spring and in communication with the ECU to detect air pressure and wherein the ECU is configured to adjust the determined vehicle load based on a pressure signal from the second pressure sensor.

2. The air suspension system of claim 1, wherein the second pressure sensor is attached proximate to an air spring for a rear axle of the vehicle, and wherein the at least one of the other air springs is at the other corner of the rear axle.

3. The air suspension system of claim 2, wherein the vehicle load, the second pressure, and the calibrated pressure are used to determine the rear axle load.

4. A method of determining vehicle load for a vehicle equipped with an air suspension system having four air spring corner assemblies, said method comprising:
    detecting a first pressure signal from a first pressure sensor located within a valve block for the air suspension system;
    calculating a vehicle load based at least partially on the first pressure signal;
    detecting a second pressure signal from a second pressure sensor proximate to an air spring at one corner of the air suspension system;
    determining at least one of a corrected vehicle load and a corrected axle load based on the first pressure signal and the second pressure signal; and
    adjusting the air spring corner assemblies based at least partially based on the corrected vehicle load and/or the corrected axle load.

5. The method of claim 4, wherein the second pressure signal is for an air spring at one corner a rear axle of the vehicle, and wherein a calibrated pressure is determined from the second pressure signal for the air spring at the other corner of the rear axle.

* * * * *